(12) United States Patent
Sultenfuss et al.

(10) Patent No.: US 11,159,036 B2
(45) Date of Patent: Oct. 26, 2021

(54) SYSTEMS AND METHODS FOR FLEXIBLE POWER TOPOLOGY FOR DISPLAY ASSEMBLY IN AN INFORMATION HANDLING SYSTEM

(71) Applicant: Dell Products L.P., Round Rock, TX (US)

(72) Inventors: Andrew Thomas Sultenfuss, Leander, TX (US); Judy M. Amanor-Boadu, College Station, TX (US)

(73) Assignee: Dell Products L.P., Round Rock, TX (US)

( * ) Notice: Subject to any disclaimer, the term of this patent is extended or adjusted under 35 U.S.C. 154(b) by 554 days.

(21) Appl. No.: 15/406,369

(22) Filed: Jan. 13, 2017

(65) Prior Publication Data

US 2018/0204505 A1 Jul. 19, 2018

(51) Int. Cl.
| H02J 7/00 | (2006.01) |
| G06F 1/26 | (2006.01) |
| G06F 1/16 | (2006.01) |
| G06F 3/00 | (2006.01) |
| G06F 1/00 | (2006.01) |

(52) U.S. Cl.
CPC .............. *H02J 7/0063* (2013.01); *G06F 1/00* (2013.01); *G06F 1/1635* (2013.01); *G06F 1/1683* (2013.01); *G06F 1/266* (2013.01); *G06F 3/00* (2013.01); *G06F 2200/00* (2013.01); *G06F 2203/00* (2013.01)

(58) Field of Classification Search
CPC .......... G06F 1/26; G06F 1/2666; G06F 1/266; G06F 1/00; G06F 1/1635; G06F 1/1683; G06F 3/00; G06F 2200/00; G06F 2203/00; G09G 2330/00–12; G02F 1/266; H02J 7/0063
USPC .................................................. 713/300–340
See application file for complete search history.

(56) References Cited

U.S. PATENT DOCUMENTS

| 2002/0113907 | A1* | 8/2002 | Endo ....................... G09G 5/006 348/730 |
| 2010/0039764 | A1* | 2/2010 | Locker .................. G06F 1/1615 361/679.29 |
| 2012/0030487 | A1* | 2/2012 | Takinami ................ G06F 1/263 713/320 |
| 2015/0046727 | A1* | 2/2015 | Kobayashi .............. G06F 1/266 713/300 |

* cited by examiner

*Primary Examiner* — Stephen G Sherman
*Assistant Examiner* — Aaron Midkiff
(74) *Attorney, Agent, or Firm* — Jackson Walker L.L.P.

(57) ABSTRACT

In accordance with embodiments of the present disclosure, an information handling system may include a processor and an interface configured to electronically interface between the processor and a display assembly, wherein the interface is configured to provide a legacy supply voltage to the display assembly and an alternate supply voltage other than the legacy supply voltage to the display assembly in lieu of or in addition to the legacy supply voltage, such that the interface is compatible with each of a first type of display assembly having a first type of voltage regulator tree that generates regulated output voltages from the legacy supply voltage and a second type of display assembly having a second type of voltage regulator tree that generates regulated output voltages from the alternate supply voltage.

12 Claims, 3 Drawing Sheets

SYSTEMS AND METHODS FOR FLEXIBLE POWER TOPOLOGY FOR DISPLAY ASSEMBLY IN AN INFORMATION HANDLING SYSTEM

TECHNICAL FIELD

The present disclosure relates in general to information handling systems, and more particularly to providing a flexible power topology for a display assembly in an information handling system.

BACKGROUND

As the value and use of information continues to increase, individuals and businesses seek additional ways to process and store information. One option available to users is information handling systems. An information handling system generally processes, compiles, stores, and/or communicates information or data for business, personal, or other purposes thereby allowing users to take advantage of the value of the information. Because technology and information handling needs and requirements vary between different users or applications, information handling systems may also vary regarding what information is handled, how the information is handled, how much information is processed, stored, or communicated, and how quickly and efficiently the information may be processed, stored, or communicated. The variations in information handling systems allow for information handling systems to be general or configured for a specific user or specific use such as financial transaction processing, airline reservations, enterprise data storage, or global communications. In addition, information handling systems may include a variety of hardware and software components that may be configured to process, store, and communicate information and may include one or more computer systems, data storage systems, and networking systems.

In a mobile information handling system (e.g., notebook or laptop information handling systems), the display generally consumes more power than any other component of the mobile information handling system, and thus, it may be desirable to employ display assembly architectures that minimize power consumption. However, display assemblies and their interface with the remainder of an information handling system are often governed by existing industry conventions and specifications (e.g., standards promulgated by the Video Electronics Standards Association or "VESA"), which may otherwise limit voltage regulator tree architectures used in display assemblies. In addition, it may be impractical to create multiple interfaces or motherboards of information handling systems in order to support multiple display assembly architectures.

SUMMARY

In accordance with the teachings of the present disclosure, one or more disadvantages and problems associated with power architectures in display assemblies may be reduced or eliminated.

In accordance with embodiments of the present disclosure, an information handling system may include a processor and an interface configured to electronically interface between the processor and a display assembly, wherein the interface is configured to provide a legacy supply voltage to the display assembly and an alternate supply voltage other than the legacy supply voltage to the display assembly in lieu of or in addition to the legacy supply voltage, such that the interface is compatible with each of a first type of display assembly having a first type of voltage regulator tree that generates regulated output voltages from the legacy supply voltage and a second type of display assembly having a second type of voltage regulator tree that generates regulated output voltages from the alternate supply voltage.

In accordance with these and other embodiments of the present disclosure, an interface configured to electronically interface between a processor of an information handling system and a display assembly of the information handling system, wherein the interface comprises a first output configured to generate a legacy supply voltage and a second output configured to generate an alternate supply voltage other than the legacy supply voltage to the display assembly in lieu of or in addition to the legacy supply voltage, such that the interface is compatible with each of a first type of display assembly having a first type of voltage regulator tree that generates regulated output voltages from the legacy supply voltage and a second type of display assembly having a second type of voltage regulator tree that generates regulated output voltages from the alternate supply voltage.

In accordance with these and other embodiments of the present disclosure, a method may include generating, by an interface configured to electronically interface between a processor of an information handling system and a display assembly of the information handling system, a legacy supply voltage and generating, by the interface, an alternate supply voltage other than the legacy supply voltage to the display assembly in lieu of or in addition to the legacy supply voltage, such that the interface is compatible with each of a first type of display assembly having a first type of voltage regulator tree that generates regulated output voltages from the legacy supply voltage and a second type of display assembly having a second type of voltage regulator tree that generates regulated output voltages from the alternate supply voltage.

Technical advantages of the present disclosure may be readily apparent to one skilled in the art from the figures, description and claims included herein. The objects and advantages of the embodiments will be realized and achieved at least by the elements, features, and combinations particularly pointed out in the claims.

It is to be understood that both the foregoing general description and the following detailed description are examples and explanatory and are not restrictive of the claims set forth in this disclosure.

BRIEF DESCRIPTION OF THE DRAWINGS

A more complete understanding of the present embodiments and advantages thereof may be acquired by referring to the following description taken in conjunction with the accompanying drawings, in which like reference numbers indicate like features, and wherein.

DETAILED DESCRIPTION

Figure 1:
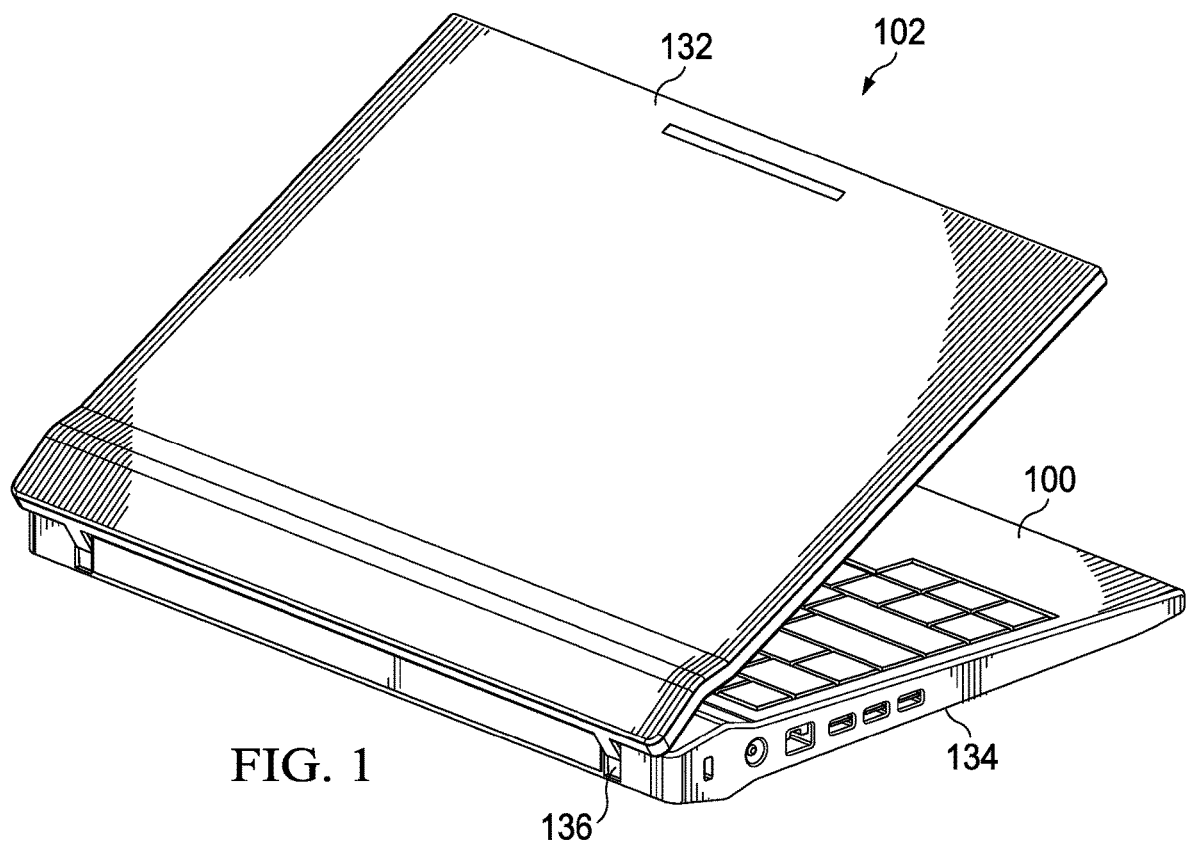
FIG. 1 illustrates an exterior view of an example information handling system embodied as a notebook or laptop computer, in accordance with embodiments of the present disclosure.
Figure 2:
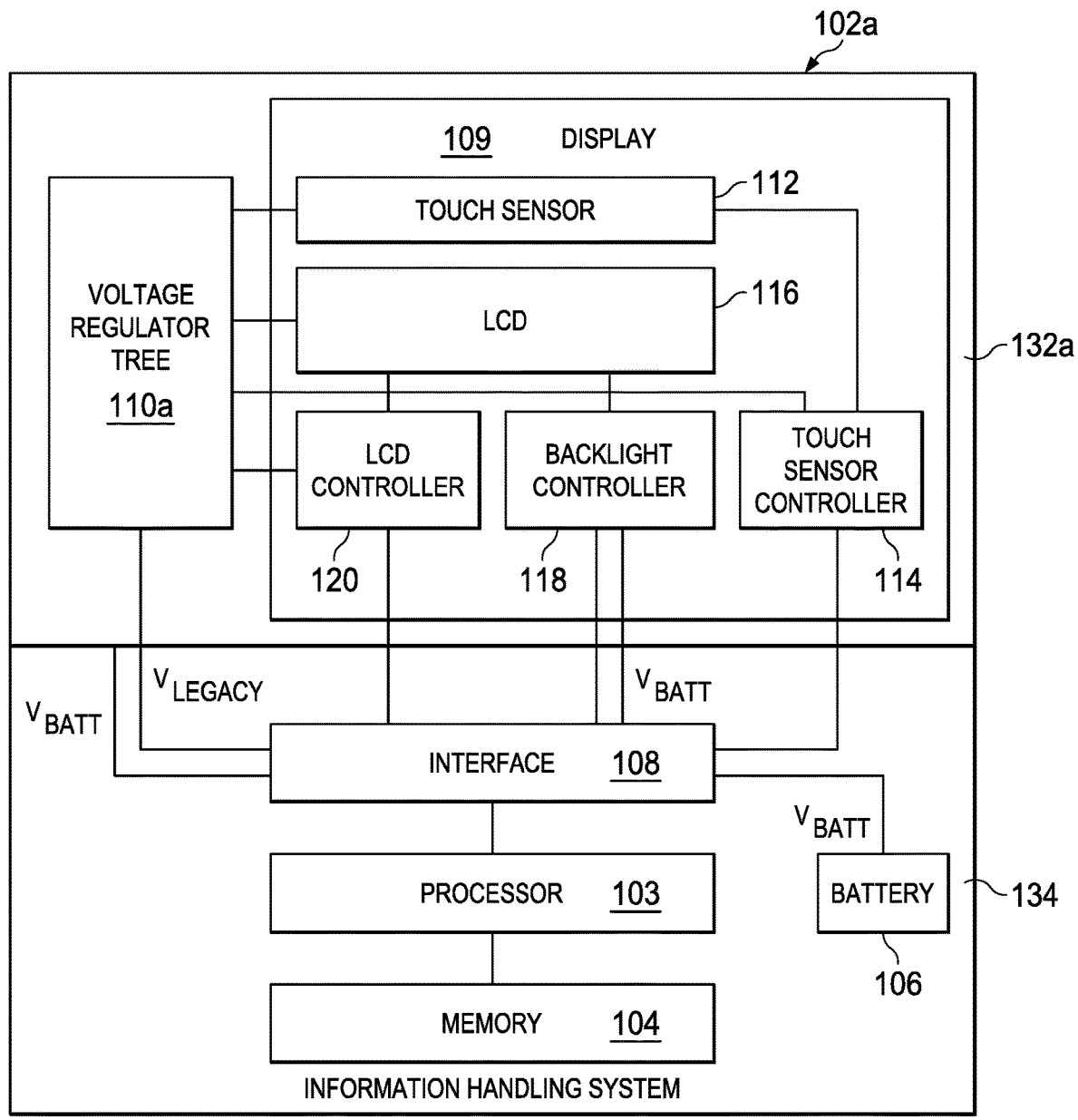
FIG. 2 illustrates a block diagram of an example information handling system, in accordance with certain embodiments of the present disclosure.
Figure 3:
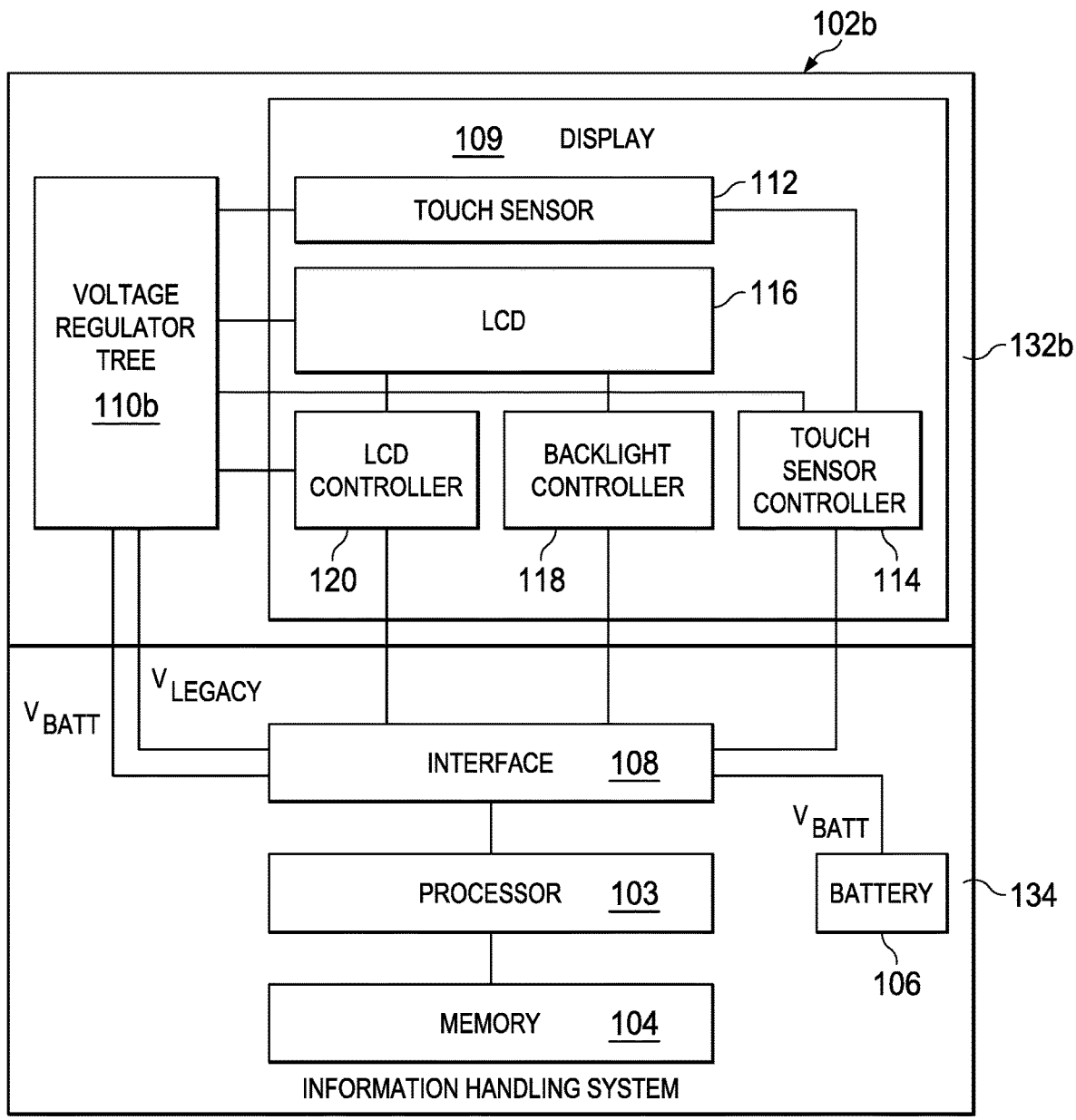
FIG. 3 illustrates a block diagram of another example information handling system, in accordance with certain embodiments of the present disclosure.

Preferred embodiments and their advantages are best understood by reference to FIGS. 1 through 3, wherein like numbers are used to indicate like and corresponding parts.

For the purposes of this disclosure, an information handling system may include any instrumentality or aggregate of instrumentalities operable to compute, classify, process, transmit, receive, retrieve, originate, switch, store, display, manifest, detect, record, reproduce, handle, or utilize any form of information, intelligence, or data for business, scientific, control, entertainment, or other purposes. For example, an information handling system may be a personal computer, a personal digital assistant (PDA), a consumer electronic device, a network storage device, or any other suitable device and may vary in size, shape, performance, functionality, and price. The information handling system may include memory, one or more processing resources such as a central processing unit ("CPU") or hardware or software control logic. Additional components of the information handling system may include one or more storage devices, one or more communications ports for communicating with external devices as well as various input/output ("I/O") devices, such as a keyboard, a mouse, and a video display. The information handling system may also include one or more buses operable to transmit communication between the various hardware components.

For the purposes of this disclosure, computer-readable media may include any instrumentality or aggregation of instrumentalities that may retain data and/or instructions for a period of time. Computer-readable media may include, without limitation, storage media such as a direct access storage device (e.g., a hard disk drive or floppy disk), a sequential access storage device (e.g., a tape disk drive), compact disk, CD-ROM, DVD, random access memory (RAM), read-only memory (ROM), electrically erasable programmable read-only memory (EEPROM), and/or flash memory; as well as communications media such as wires, optical fibers, microwaves, radio waves, and other electromagnetic and/or optical carriers; and/or any combination of the foregoing.

For the purposes of this disclosure, information handling resources may broadly refer to any component system, device or apparatus of an information handling system, including without limitation processors, service processors, basic input/output systems (BIOSs), buses, memories, I/O devices and/or interfaces, storage resources, network interfaces, motherboards, and/or any other components and/or elements of an information handling system.

FIG. 1 illustrates an exterior view of example information handling system 102 embodied as a notebook or laptop computer, in accordance with embodiments of the present disclosure. As depicted in FIG. 1, information handling system 102 may include a display assembly 132 (which may house display 109 (FIG. 2) and/or other information handling resources) and a keyboard assembly 134 (which may house a keyboard, pointing device, and/or other information handling resources) hingedly coupled via one or more hinges 136. Each of display assembly 132 and keyboard assembly 134 may be integral parts of an enclosure 100 for information handling system 102. Each of display assembly 132 and keyboard assembly 134 may have an enclosure made from one or more suitable materials, including without limitation plastic, steel, and/or aluminum. Although information handling system 102 is shown in FIG. 1 as having certain components (e.g., display assembly 132, keyboard assembly 134, and hinge 136), information handling system 102 may include any other suitable components which may not have been depicted in FIG. 1 for the purposes of clarity and exposition. In operation, information handling system 102 may be translated between a closed position (e.g., a position of display assembly 132 relative to keyboard assembly 134 such that display assembly 132 substantially overlays keyboard assembly 134, or vice versa) and an open position (e.g., a position of display assembly 132 relative to keyboard assembly 134 such that display assembly 132 does not substantially overlay keyboard assembly 134, or vice versa, such as when the angle formed by display assembly 132 and keyboard assembly 134 at hinge 136 is substantially non-zero). In some embodiments, a user may be able to open information handling system 102 into a tablet mode, by rotating display assembly 132 relative to keyboard assembly 134 beyond an angle of 180 degrees relative to the closed position.

FIG. 2 illustrates a block diagram of an example information handling system 102a, in accordance with embodiments of the present disclosure. In some embodiments, information handling system 102a may implement all or a portion of information handling system 102 shown in FIG. 1. In some embodiments, information handling system 102a may be a mobile device sized and shaped to be readily transported and carried on a person of a user of information handling system 102a (e.g., a notebook or laptop computer, etc.). As depicted in FIG. 2, information handling system 102a may include a keyboard assembly 134 housing a processor 103, a memory 104 communicatively coupled to processor 103, a battery 106, and an interface 108, and may also include a display assembly 132a housing a display 109 and a voltage regulator tree 110a.

Processor 103 may include any system, device, or apparatus configured to interpret and/or execute program instructions and/or process data, and may include, without limitation, a microprocessor, microcontroller, digital signal processor (DSP), application specific integrated circuit (ASIC), or any other digital or analog circuitry configured to interpret and/or execute program instructions and/or process data. In some embodiments, processor 103 may interpret and/or execute program instructions and/or process data stored in memory 104 and/or another component of information handling system 102a.

Memory 104 may be communicatively coupled to processor 103 and may include any system, device, or apparatus configured to retain program instructions and/or data for a period of time (e.g., computer-readable media). Memory 104 may include RAM, EEPROM, a PCMCIA card, flash memory, magnetic storage, opto-magnetic storage, or any suitable selection and/or array of volatile or non-volatile memory that retains data after power to information handling system 102 is turned off.

Battery 106 may comprise any system, device, or apparatus configured to store energy which may be used by information handling system 102a to power components of information handling system 102a to perform the functionality thereof. In some embodiments, battery 106 may comprise an electrochemical cell configured to convert stored chemical energy into electrical energy. As shown in FIG. 2, battery 106 may output a voltage $V_{BATT}$.

Interface 108 may comprise any system, device, or apparatus configured to serve as an electrical interface between components of keyboard assembly 134 (e.g., a motherboard comprising processor 103, memory 104, and battery 106) and components of display assembly 132 (e.g., display 109 and voltage regulator 110a). Accordingly, interface 108 may include any suitable combination of connectors, cabling, cabling harnesses, and/or other components to provide such an electrical interface. As shown in FIG. 2, interface 108 may be communicatively coupled to processor 103 and one or more components of display 109, thus facilitating electronic communication between processor 103 and components of display 109. As also shown in FIG. 2, interface 108 may be communicatively coupled to battery 106 and be capable of outputting from interface 108 voltage $V_{BATT}$ generated by battery 106 in addition to a legacy voltage $V_{LEGACY}$. Voltage $V_{LEGACY}$ may be a voltage specified by an existing standard for display device power topologies (e.g., 3.3 volts in accordance with the VESA standard).

Display 109 may comprise any instrumentality or aggregation of instrumentalities by which a user may interact with information handling system 102a. For example, display 109 may permit a user to input data and/or instructions into information handling system 102a, and/or otherwise manipulate information handling system 102a and its associated components. Display 109 may also permit information handling system 102a to communicate data to a user, e.g., by way of a display device. In some embodiments, display 109 may comprise a touch-screen display. When implemented as a touch-screen display, display 109 may comprise touch sensor 112, touch sensor controller 114, liquid crystal display (LCD) 116, backlight controller 118, and LCD controller 120.

As known in the art, a touch sensor 112 may include any system, device, or apparatus configured to detect tactile touches (e.g., by a human finger, a stylus, etc.) on touch sensor 112 and generate one or more signals indicative of the occurrence of such touches and/or the locations of such touches on the touch sensor 112. In some embodiments, touch sensor 112 may be a capacitive touch sensor configured to detect changes in capacitance induced by tactile touches. In these and other embodiments, touch sensor 112 may be constructed from substantially optically transparent material and placed over LCD 116 or another display apparatus, allowing a user to view graphical elements of the touch display while interacting with touch sensor 112.

Touch sensor controller 114 may be communicatively coupled between touch sensor 112 and processor 103, and comprise any system, device, or apparatus configured to process signals indicative of touches received from touch sensor 112 and translate such signals into signals which may be processed by processor 103. In addition, touch sensor controller 114 may control one or more operating conditions associated with touch sensor 112, including the rate of sampling touches, whether touch sensor 112 is powered on or enabled, and/or other operating conditions.

LCD 116 may comprise any suitable system, device, or apparatus configured to display human-perceptible graphical data and/or alphanumeric data to display 109. As is known in the art, LCD 116 may include an array of liquid crystals configured to modulate light generated by a backlight in order to create graphical data and/or alphanumeric data on LCD 116. Although FIG. 2 specifically depicts LCD 116, in some embodiments display 109 may include a display device other than an LCD.

Backlight controller 118 may be communicatively coupled between LCD 116 and processor 103, and comprise any system, device, or apparatus configured to control operating of a backlight present in LCD 116, including controlling an intensity of light generated by such backlight.

LCD controller 120 may be communicatively coupled between LCD 116 and processor 103, and comprise any system, device, or apparatus configured to, based on graphical data communicated from processor 103 to LCD controller 120, control individual liquid crystals of LCD 116 in order to modulate the light generated by a backlight, thus creating a display of graphical data and/or alphanumeric data on LCD 116.

Voltage regulator tree 110a may comprise any suitable system device, or apparatus configured to receive a voltage (e.g., voltage $V_{LEGACY}$) as an input, and generate from such voltage one or more regulated output voltages to power components of display 109 that may have varying input voltage requirements from each other. Accordingly, voltage regulator tree 110a may include one or more direct current-to-direct current voltage converters, including without limitation one or more buck converters, one or more buck-boost converters, and one or more boost converters.

In addition to processor 103, memory 104, battery 106, interface 108, display 109, and voltage regulator tree 110a, information handling system 102a may include one or more other information handling resources. An information handling resource may include any component system, device or apparatus of an information handling system, including without limitation, a processor (e.g., processor 103), bus, memory (e.g., memory 104), I/O device and/or interface, storage resource (e.g., hard disk drives), network interface, electro-mechanical device (e.g., fan), display, power supply, and/or any portion thereof.

FIG. 3 illustrates a block diagram of another example information handling system 102b, in accordance with embodiments of the present disclosure. In some embodiments, information handling system 102b may implement all or a portion of information handling system 102a shown in FIG. 2. In some embodiments, information handling system 102b may be a mobile device sized and shaped to be readily transported and carried on a person of a user of information handling system 102b (e.g., a notebook or laptop computer, etc.). Information handling system 102b of FIG. 3 may be similar in many respects to information handling system 102a of FIG. 2, and thus, only the main differences between information handling system 102b and information handling system 102a are discussed below.

As depicted in FIG. 3, information handling system 102b may include a keyboard assembly 134 identical or highly substantially similar to that of keyboard assembly 134 of FIG. 2. Furthermore, display assembly 132b of information handling system 102b may be similar to display assembly 132a of information handling system 102a, except that display assembly 132b may include voltage regulator tree 110b in place of voltage regulator tree 110b.

Voltage regulator tree 110b may comprise any suitable system, device, or apparatus configured to receive, in addition to or in lieu of a legacy voltage $V_{LEGACY}$, an alternate voltage supply (e.g., $V_{BATT}$) as an input, and generate from such alternate voltage supply one or more regulated output voltages to power components of display 109 that may have varying input voltage requirements from each other. Accordingly, voltage regulator tree 110b may include one or more direct current-to-direct current voltage converters, including without limitation one or more buck converters, one or more buck-boost converters, and one or more boost converters.

Thus, as shown in FIGS. 2 and 3, information handling systems using the methods and systems disclosed herein may have different topologies for their display assemblies, while maintaining a common topology of keyboard assembly 134. Such common topology of keyboard assembly 134 may include an interface (e.g., interface 108) that is compatible with both standard or legacy display architectures that provide a legacy supply voltage to the display (as shown in FIG. 2), as well as modified architectures that provide an alternate supply voltage other than the legacy supply voltage in lieu of or in addition to the legacy supply voltage (as shown in FIG. 3). In some instances, the ability to implement display assemblies with the alternate supply voltage may allow a designer to design a display assembly power architecture with lower power consumption than possible with the legacy supply voltage, all the while maintaining the design simplicity of having a common topology for the keyboard assembly, reducing or eliminating the need to design a keyboard assembly compatible with the power architecture of the display assembly.

As used herein, when two or more elements are referred to as "coupled" to one another, such term indicates that such two or more elements are in electronic communication or mechanical communication, as applicable, whether connected indirectly or directly, with or without intervening elements.

This disclosure encompasses all changes, substitutions, variations, alterations, and modifications to the example embodiments herein that a person having ordinary skill in the art would comprehend. Similarly, where appropriate, the appended claims encompass all changes, substitutions, variations, alterations, and modifications to the example embodiments herein that a person having ordinary skill in the art would comprehend. Moreover, reference in the appended claims to an apparatus or system or a component of an apparatus or system being adapted to, arranged to, capable of, configured to, enabled to, operable to, or operative to perform a particular function encompasses that apparatus, system, or component, whether or not it or that particular function is activated, turned on, or unlocked, as long as that apparatus, system, or component is so adapted, arranged, capable, configured, enabled, operable, or operative.

All examples and conditional language recited herein are intended for pedagogical objects to aid the reader in understanding the disclosure and the concepts contributed by the inventor to furthering the art, and are construed as being without limitation to such specifically recited examples and conditions. Although embodiments of the present disclosure have been described in detail, it should be understood that various changes, substitutions, and alterations could be made hereto without departing from the spirit and scope of the disclosure.

What is claimed is:

1. An information handling system comprising:
a processor; and
an interface configured to electronically interface between the processor and a display assembly, wherein the interface is configured to provide a legacy supply voltage to the display assembly and an alternate supply voltage different in magnitude from the legacy supply voltage to the display assembly in addition to the legacy supply voltage;
wherein the legacy supply voltage and the alternate supply voltage are direct-current (DC) voltages, such that the interface is compatible with each of:
a first type of display assembly having a first type of voltage regulator tree that is configured to generate regulated output voltages from the legacy supply voltage; and
a second type of display assembly having a second type of voltage regulator tree that is configured to generate regulated output voltages from the alternate supply voltage.

2. The information handling system of claim 1, further comprising a battery and wherein the alternate supply voltage comprises a voltage generated by the battery.

3. The information handling system of claim 1, wherein the second type of voltage regulator tree is configured to generate regulated output voltages from the alternate supply voltage but not the legacy supply voltage.

4. The information handling system of claim 1, wherein the second type of voltage regulator tree is configured to generate regulated output voltages from the alternate supply voltage and the legacy supply voltage.

5. An interface configured to electronically interface between a processor of an information handling system and a display assembly of the information handling system, wherein the interface comprises:
a first output configured to generate a legacy supply voltage; and
a second output configured to generate an alternate supply voltage different in magnitude from the legacy supply voltage to the display assembly in addition to the legacy supply voltage;
wherein the legacy supply voltage and the alternate supply voltage are direct-current (DC) voltages, such that the interface is compatible with each of:
a first type of display assembly having a first type of voltage regulator tree that is configured to generate regulated output voltages from the legacy supply voltage; and
a second type of display assembly having a second type of voltage regulator tree that is configured to generate regulated output voltages from the alternate supply voltage.

6. The interface of claim 5, further comprising an input configured to receive a battery voltage from a battery coupled to the interface, and wherein the alternate supply voltage comprises the battery voltage.

7. The interface of claim 5, wherein the second type of voltage regulator tree is configured to generate regulated output voltages from the alternate supply voltage but not the legacy supply voltage.

8. The interface of claim 5, wherein the second type of voltage regulator tree is configured to generate regulated output voltages from the alternate supply voltage and the legacy supply voltage.

9. A method comprising:
generating, by an interface configured to electronically interface between a processor of an information handling system and a display assembly of the information handling system, a legacy supply voltage; and
generating, by the interface, an alternate supply voltage different in magnitude from the legacy supply voltage to the display assembly in addition to the legacy supply voltage;
wherein the legacy supply voltage and the alternate supply voltage are direct-current (DC) voltages, such that the interface is compatible with each of:
a first type of display assembly having a first type of voltage regulator tree that generates regulated output voltages from the legacy supply voltage; and
a second type of display assembly having a second type of voltage regulator tree that generates regulated output voltages from the alternate supply voltage.

10. The method of claim 9, further comprising receiving a battery voltage from a battery coupled to the interface, and wherein the alternate supply voltage comprises the battery voltage.

11. The method of claim 9, wherein the second type of voltage regulator tree generates regulated output voltages from the alternate supply voltage but not the legacy supply voltage.

12. The method of claim 9, wherein the second type of voltage regulator tree generates regulated output voltages from the alternate supply voltage and the legacy supply voltage.

\* \* \* \* \*